No. 653,657.  
L. C. CARY.  
AUTOMATIC AIR BRAKE COUPLING.  
(Application filed May 3, 1898.)  
Patented July 17, 1900.
(No Model.)  
2 Sheets—Sheet 1.
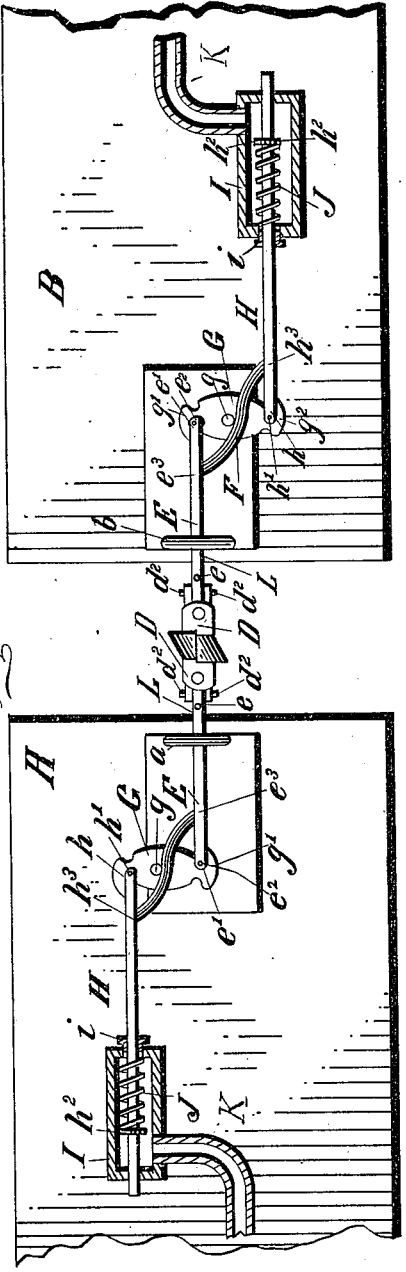
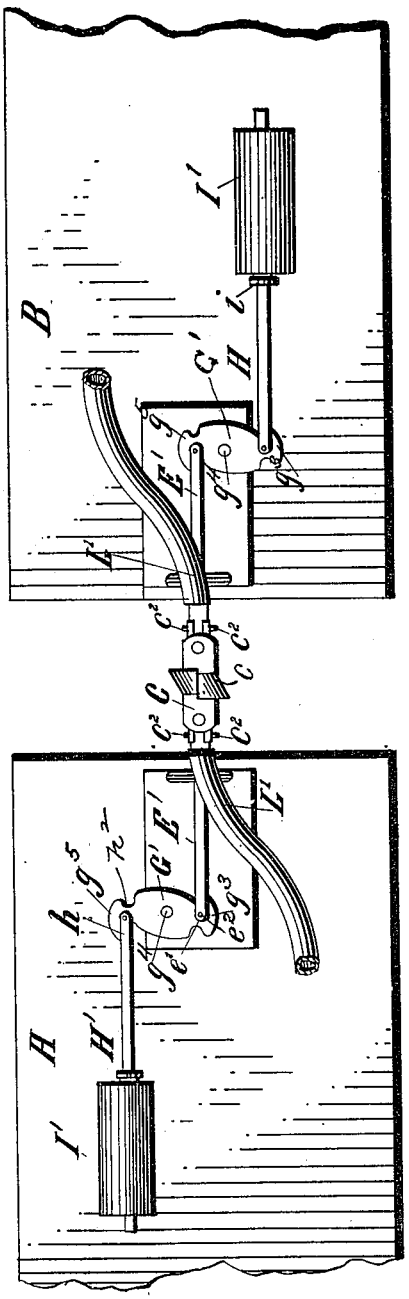
WITNESSES  
INVENTOR  
*L. C. Cary*  
*by Watson & Co.*  
Attorneys.

No. 653,657. Patented July 17, 1900.
L. C. CARY.
AUTOMATIC AIR BRAKE COUPLING.
(Application filed May 3, 1898.)
(No Model.) 2 Sheets—Sheet 2.

WITNESSES
A. B. Driggs
R. C. Good.

INVENTOR
Lewis C. Cary
by Walton & Co.
Attorneys.

UNITED STATES PATENT OFFICE.

LEWIS C. CARY, OF EL PASO, TEXAS, ASSIGNOR OF ONE-HALF TO JULIA CALDWELL, OF SAME PLACE.

AUTOMATIC AIR-BRAKE COUPLING.

SPECIFICATION forming part of Letters Patent No. 653,657, dated July 17, 1900.

Application filed May 3, 1898. Serial No. 679,571. (No model.)

*To all whom it may concern:*

Be it known that I, LEWIS C. CARY, a citizen of the United States, residing at El Paso, in the county of El Paso and State of Texas, have invented certain new and useful Improvements in Automatic Air-Brake Couplers; and I do hereby declare the following to be a full, clear, and exact description of the invention, such as will enable others skilled in the art to which it appertains to make and use the same.

This invention relates to improvements in automatic air-brake couplings for cars.

An object of the invention is to provide air-brake couplings which are positive of action, readily attached to any cars, and which are inexpensive in cost.

A further object is to provide certain improved means of adjustment which will compensate readily for short or long distances between cars and in all cases keep the couplings intact, while permitting the same to be readily coupled and uncoupled.

The invention consists in further and more detailed improvements, which will be pointed out in the specification and claims.

For a clear and complete understanding of the invention reference will be had to the accompanying drawings, wherein corresponding letters indicate like parts in the several views, in which—

Figure 3:
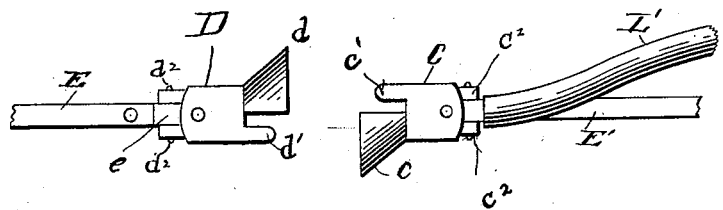
Figure 4:
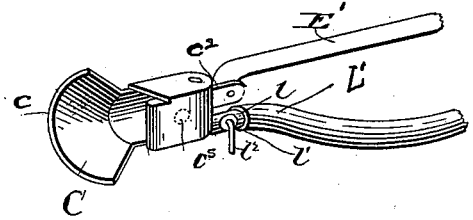
Figure 5:
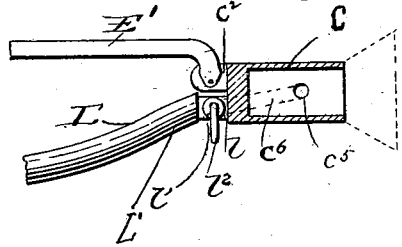
Figure 6:
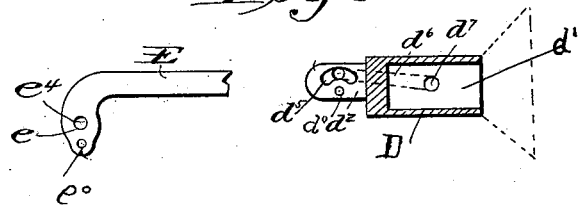

Figure 1 is a plan view of the couplers on the adjacent ends of two cars in locked position, the view being taken from underneath, trucks and other mechanism being removed for clearer illustration. Fig. 2 is a similar view showing a modification of the air-pipes. Fig. 3 is a plan of both forms of coupler-heads unlocked and ready for engagement. Fig. 4 is a perspective view of the head of the modified form of air-coupler. Fig. 5 is a sectional view of the same, and Fig. 6 represents details of the connection of the coupler-head with the hollow air-pipe shown in Fig. 1 to permit movement of the parts.

In the drawings, A and B refer to the adjacent ends of two cars equipped with my improved pipe-coupling for air-brakes $a$ and $b$, being depending loops on the ends of the bottoms of the cars to hold up the coupler-heads while permitting a certain amount of lateral play.

D refers to the coupler-heads of the air-brakes, the left front half $d$ of each being flared or half bell-shaped, and the opposite sides $d'$ of the coupler-heads are flat and somewhat extended to readily engage with each other in opposing coupler-heads. These heads D are hollow-shaped, as is customary in couplers of this class, the openings extending from the front to the rear portions of the heads, so as to permit the parts $d'$ to contact and lap when the heads come together, as shown in Fig. 1, the flaring portions $d$ serving to guide the heads together in case the heads should be out of alinement for coupling when the cars come together.

At the rear ends of heads D are provided ears $d^2$ $d^2$, in or between which are pivoted the forward ends $e$ of tubular bars, and the outer ends $e'$ of bars E are divided and engage between said divided members one end $g'$ of a compensator device G, to which it is pivoted at $e^2$, the compensator being centrally pivoted at $g$ to the bottom of the car, and to the other end $g^2$ of this compensator is similarly pivoted at $h'$ the divided end $h$ of a rod H, which extends rearwardly into a spring-retaining cylinder I, containing suitable packing $i$, and has a washer $h^2$, between which and the front head of the cylinder I is held a tension-spring J, which normally tends to push rod E and the coupler-head thereon forward to hold the heads together when the cars are coupled.

Rods E and H, except their rear and forward ends, respectively, are hollow or tubular and at points $e^3$ and $h^3$ are provided with openings and suitable devices for the connection of the same with the ends of tubing F of sufficient length to permit free play of the compensator G without interfering with the same.

The forward ends of the tubular bars E are depressed (see Fig. 6) and pivoted at their lower ends at $e^0$ and $d^0$ between the ears $d^2$ on the coupler-heads, and on one side of each of said rods E, just above the pivotal point, is provided an opening $e^4$, which registers with a slot $d^5$ in the inner face of the adjacent ear, said slot being connected by an air-passage $d^6$ with a port $d^7$, centrally located on the interior surface of the engaging extension $d'$ of the coupler-heads, thus forming continuous passages for air from the train-pipes K through cylinders I, and through the coupler-heads when they are coupled.

The slots $d^5$ in the ears $d^2$, adjacent to opening $e^4$ in the tubular bars, permit a slight vertical movement of the coupler-heads to suit ears of different heights, and the depressed ends of bars E are flatly formed, so as to fit tightly between the ears aforesaid to form air-tight connections.

In the modified form of my air-coupler (see Figs. 2, 4, and 5) instead of using tubular rods E bars E' are formed solid and pivoted similarly between the ears $c^2$ on the coupler-heads C. These bars E' are bifurcated and are pivotally connected, as at $e^3$, to one end $g^3$ of a compensating device or link G', to which said compensating device is centrally pivoted, as at $g^4$. To the other end $g^5$ of this link G' is pivotally connected, as at $h'$, the bifurcated ends $h^2$ of a solid bar H'. This solid bar H' extends rearwardly through a spring-containing cylinder I', which is not connected to the air-brake system, as is the cylinder I in the preferred form. Within this cylinder a coiled spring is similarly secured to the bar H', as in the case of the spring J, and has the same function.

The ears $c^2$ are formed without slots, and below said ears the coupler-head C is formed with a projecting nipple $l$, which is connected with a port $c^5$ in the extension C' by an air-passage $c^6$. This nipple, to which the air-hose L' is secured, is provided with a cut-off or valve $l'$, operated by the handle $l^2$. This air-hose L' is long enough not to interfere with the play of the compensator G' and the rear end of train-pipe leading from the air-brake system carried beneath the car. It is evident that this modification does not interfere with the operation of the coupling-heads and may be used upon any cars in connection with the first device as readily as if all the cars were equipped alike.

The flaring-shaped portions $c$ and $d$ of the coupler-heads are found in practice to be exceedingly useful in automatically coupling the heads C and D together without the necessity of a person going between the cars, and the compensator device is found to be practical in keeping the parts locked, taking up any play and preventing wear and tear—objections now encountered in many forms of air-coupling devices.

As no claim is made for air-reservoirs and connections and as this device may be used in connection with any that are now used, description of the latter has been omitted.

Having thus described my invention, what I claim, and desire to secure by Letters Patent, is—

1. An automatic air-brake-coupling head, comprising a hollow body portion, a flared coupling-guide and engaging extension, formed with a port leading to an air-passage in the body of the coupling-head, in combination with a rearwardly-extending stem or bar suitably supported beneath the car-body, a spring-actuated bar also supported beneath the car-body, a link pivotally connected with the rearwardly-extending bar and with the spring-actuated bar, a pivotal connection of the link with the car-body between said connections with the aforesaid bars, and suitable connections between the passage in the coupling-heads and a source of compressed-air supply.

2. Automatic air-couplers for cars comprising correspondingly-shaped flaring guides, oppositely-arranged engaging extensions, opposite the flaring guides, said engaging extensions having central interior apertures capable of registration, when the heads are locked together, air-passages leading from said apertures to the rear ends of said heads, rearwardly-extending bars pivotally connected with the rear ends of said heads, depending loops on the bottoms of the cars supporting said bars and heads, compensators centrally pivoted to the bottoms of the cars, corresponding ends of which are pivotally secured to the rear ends of said bars, second rods having their forward ends pivotally connected to the other ends of said compensators, and tension devices connecting said second bars to the car-body and operating to force them forwardly, and air-pipe connections between said head portions and air-brake apparatus carried by said car, substantially as described.

3. Automatic air-couplers comprising a flaring half-bell-shaped guide portion correspondingly arranged on the head of each coupler, an engaging extension opposite each flaring portion, said pieces having air-passages extending from the interior faces to the rear end of the heads thereof, said openings on said faces capable of registration when said heads are locked together, hollow bars pivotally connected to the rear ends of said heads and forming a continuous air-passage in connection with said heads, compensators centrally pivoted to the bottoms of the cars, and having corresponding ends pivotally connected with the rear ends of said bars, said rods being supported in depending brackets on the car-bottoms, second hollow bars having their forward ends pivotally connected to the other ends of the compensators, their rear ends passing into cylinders on the car-bottoms, springs secured to said bars within said cylinders and pressing against the forward ends thereof to normally force said second bars rearwardly, flexible pipes connecting said rods, near their pivotal connections with said compensators, and valves in the first bars near said heads for shutting off the air, substantially as described and set forth.

In testimony whereof I affix my signature in presence of two witnesses.

LEWIS C. CARY.

Witnesses:
 Jos. N. SWEENEY,
 H. A. O'NEILL.